(12) United States Patent
Schwarz et al.

(10) Patent No.: US 11,671,637 B2
(45) Date of Patent: *Jun. 6, 2023

(54) CONTENT PROTECTION

(71) Applicant: NAGRAVISION S.A., Cheseaux-sur-Lausanne (CH)

(72) Inventors: Christian Schwarz, Vuarrens (CH); Andre Nicoulin, Lausanne (CH); Didier Hunacek, Blonay (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 293 days.

This patent is subject to a terminal disclaimer.

(21) Appl. No.: 17/147,349

(22) Filed: Jan. 12, 2021

(65) Prior Publication Data

US 2021/0168413 A1 Jun. 3, 2021

Related U.S. Application Data

(62) Division of application No. 16/075,102, filed as application No. PCT/EP2016/065129 on Jun. 29, 2016, now Pat. No. 10,931,983.

(30) Foreign Application Priority Data

Jun. 29, 2015 (EP) ..................................... 15174332

(51) Int. Cl.
*H04N 21/2347* (2011.01)
*H04N 21/266* (2011.01)
(Continued)

(52) U.S. Cl.
CPC ......... *H04N 21/2347* (2013.01); *G06F 21/57* (2013.01); *H04L 9/16* (2013.01);
(Continued)

(58) Field of Classification Search
CPC ......... H04N 21/2347; H04N 21/26606; H04N 21/26613; H04N 21/4181; H04N 21/4405;
(Continued)

(56) References Cited

U.S. PATENT DOCUMENTS 8,577,334 B1 11/2013 Smith
9,043,827 B1 5/2015 Rapoport et al.
(Continued)

FOREIGN PATENT DOCUMENTS

CN 1918914 A 2/2007
EP 1 743 229 B1 10/2008
(Continued)

OTHER PUBLICATIONS

Extended European Search Report dated Mar. 16, 2021 in European Patent Application No. 21158744.9, 4 pages.
(Continued)

*Primary Examiner* — Nicholas T Corbo
(74) *Attorney, Agent, or Firm* — Oblon, McClelland, Maier & Neustadt, L.L.P.

(57) ABSTRACT

Devices, servers, systems and methods for content protection are provided. Disclosed embodiments improve temporal granularity of controlling access to the protected content and increase resilience against attacks attempting to prevent re-evaluation of conditions of access. Enforcement of re-evaluation may be based on the receipt and/or verification of tokens. In some embodiments, re-evaluation is enforced by periodically rendering content keys required for content decryption unuseable and/or clearing content keys already in use.

18 Claims, 9 Drawing Sheets

(51) Int. Cl.

| | |
|---|---|
| *H04N 21/418* | (2011.01) |
| *H04N 21/4405* | (2011.01) |
| *H04N 21/4623* | (2011.01) |
| *G06F 21/57* | (2013.01) |
| *H04L 9/16* | (2006.01) |
| *H04L 9/32* | (2006.01) |
| *H04N 7/167* | (2011.01) |

(52) U.S. Cl.
CPC ........... *H04L 9/3213* (2013.01); *H04N 7/167* (2013.01); *H04N 21/26606* (2013.01); *H04N 21/26613* (2013.01); *H04N 21/4181* (2013.01); *H04N 21/4405* (2013.01); *H04N 21/4623* (2013.01)

(58) Field of Classification Search
CPC .... H04N 21/4623; H04N 7/167; G06F 21/57; H04L 9/16; H04L 9/3213
See application file for complete search history.

(56) References Cited

U.S. PATENT DOCUMENTS

| | | |
|---|---|---|
| 2004/0052377 A1 | 3/2004 | Mattox et al. |
| 2004/0086127 A1 | 5/2004 | Candelore |
| 2004/0128259 A1 | 7/2004 | Blakeley |
| 2004/0228175 A1 | 11/2004 | Candelore |
| 2005/0094809 A1 | 5/2005 | Pedlow et al. |
| 2006/0039560 A1 | 2/2006 | Wasilewski |
| 2009/0199287 A1 | 8/2009 | Vantalon et al. |
| 2010/0161975 A1 | 6/2010 | Ducharme |
| 2013/0077781 A1 | 3/2013 | Daemen |

FOREIGN PATENT DOCUMENTS

| | | |
|---|---|---|
| EP | 2797335 | 12/2014 |
| WO | 2015/007549 | 1/2015 |

OTHER PUBLICATIONS

International Search Report and Written Opinion for related PCT application No. PCT/EP2016/065129, dated Sep. 7, 2016, 9 pages.
Office Action dated Jul. 30, 2020 in Brasil Patent Application No. BR112017028545-2; (4 pgs.).
Office Action dated Jul. 29, 2020 in China Patent Application No. 2016800505323 (with English translation); 6 pgs.
Office Action dated Nov. 5, 2019 in China Patent Application No. 2016800505323 (with English translation); 14 pgs.
Office Action dated Jun. 26, 2020 in Europe Patent Application No. 16 734 292.2-1212; (6 pgs.).
Office Action dated Jan. 29, 2020 in Europe Patent Application No. 16 734 292.2-1212; (7 pgs.).
First Examination Report dated Jan. 21, 2021 in Indian Patent Application No. 201827000703, 6 pages.
Mexican Office Action dated Dec. 8, 2020 in Patent Application No. MX/a/2018/000268, 3 pages.

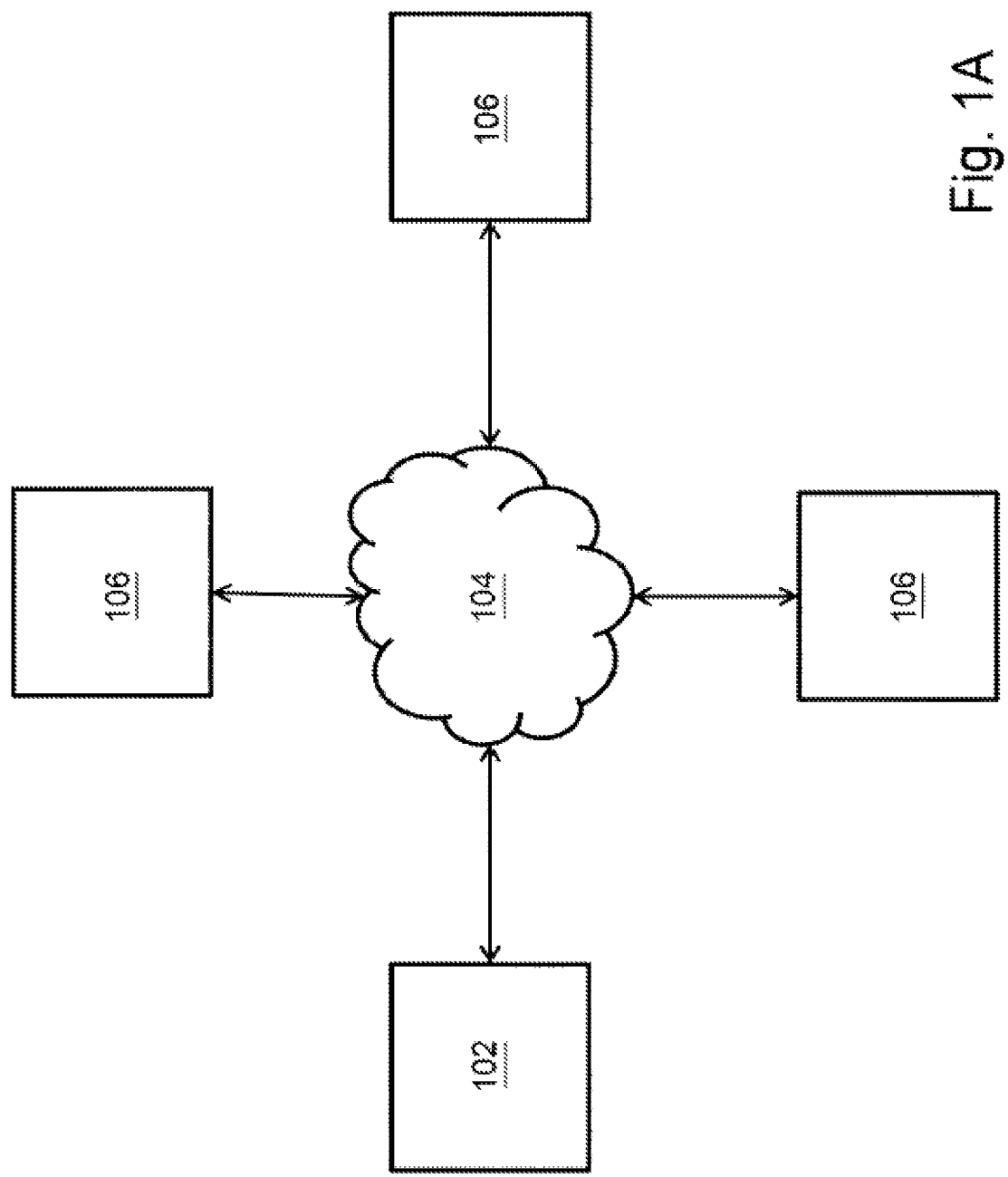

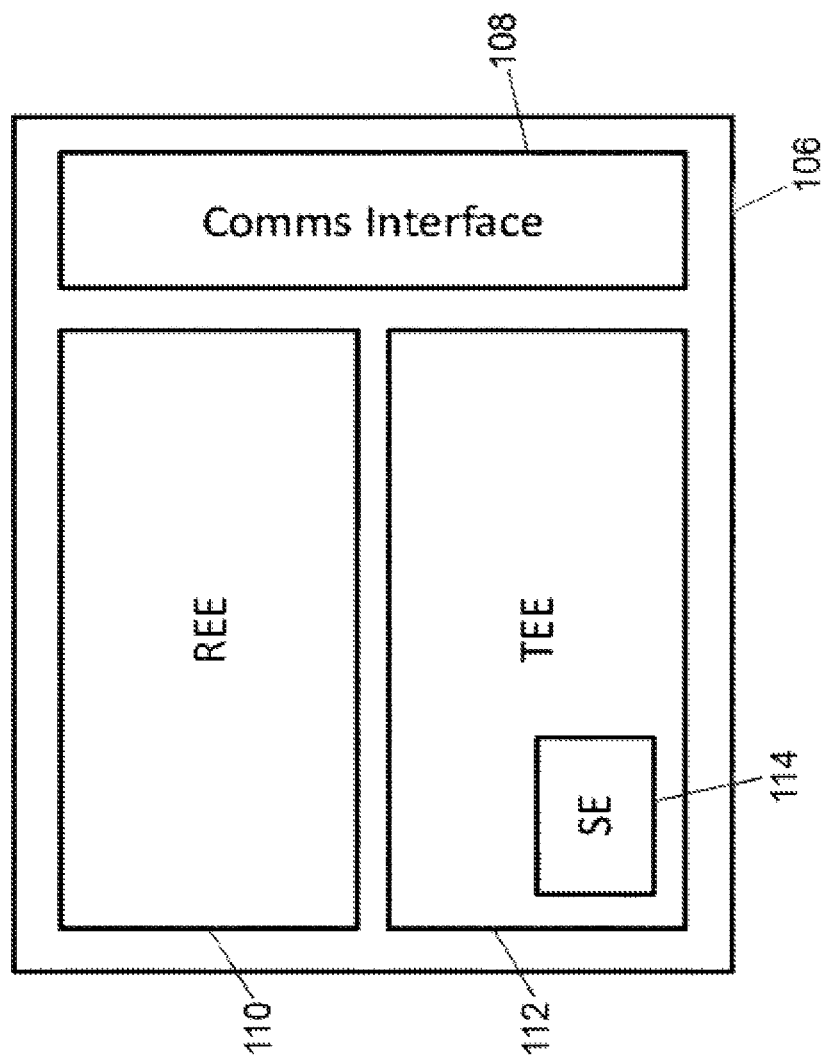

CONTENT PROTECTION

CROSS-REFERENCE TO RELATED APPLICATIONS

This document is a divisional application of and is based upon and claims the benefit of priority under 35 U.S.C. § 120 from U.S. Ser. No. 16/075,102, filed Aug. 2, 2018, herein incorporated by reference, which is a National Stage Application of International Application No. PCTEP2016065129, filed Jun. 29, 2016, which claims the benefit of priority under 35 U.S.C. § 119 from Europe Patent Application No. 15174332.5, filed Jun. 29, 2015.

The present invention relates to content protection systems, methods and devices, more specifically to systems, methods and devices for protecting media content from unauthorised access.

BACKGROUND

Several types of content protection systems are known. For example, in digital broadcasting, conditional access to broadcast channels is typically implemented using the DVB standards, which involve scrambling the broadcast content with a key, often referred to as a control word that is changing frequently, for example every 10 seconds, so that any one key is valid only for the period until the next key change. The keys are transmitted in encrypted form and their decryption at the receiver is conditional on the positive evaluation by a conditional access module at the receiver of an access condition transmitted together with the key in a message typically referred to as entitlement control message ECM. After a key change, the previous key will not decrypt the next chunk, and, therefore, to continue decrypting the content, the evaluation of the ECM for each chunk is enforced. Therefore, if the entitlement changes, the content remains accessible only for a short period of time.

Other ways of transmitting and consuming content are becoming increasingly common, using standards other than DVB. In some, in particular in the case of content transmission using an internet protocol over a third party network not under the control of the content provider administering the conditional access (over-the-top or OTT), for example using standards such as MPEG-DASH, there are particular challenges. Typically, and in particular in the OTT context, in these settings the key used to scramble the content is typically valid for the whole content, e.g. a whole film or episode of as series, or even the whole series. Once the access conditions for this key have been evaluated positively and the key decrypted and store accessible for a descrambler to descramble the content, there is no way to securely revoke the key (make it inaccessible or unusable for the descrambler) until the next reboot. The evaluation is done only once and the key will then remain accessible until the device is rebooted, even if the entitlement becomes obsolete. There is therefore a need for a content protection system, method and device, in particular although not exclusively in the context of OTT, which increases granularity of access control.

SUMMARY

Aspects of the invention are set out in the independent claims. Aspects of some specific embodiments are set out in the dependent claims.

In overview, embodiments disclosed herein allow the entitlement to use a key to be re-evaluated and enforced at a higher level of temporal granularity. More specifically, some embodiments are configured to regularly re-evaluate access criteria using trusted/authenticated components, whether done in hardware or software. In particular, some embodiments re-valuate access conditions periodically and prevent use of an otherwise still valid key for descrambling if the re-evaluation is negative. In some embodiments, a client device decrypts an encrypted content key if an access condition is met to provide access to encrypted media content. The device re-evaluates within an interval whether access to the content key should continue to be allowed and, if the re-evaluation is negative, prevents access to the content key so that the encrypted media content cannot anymore be decrypted. Advantageously, this provides a finer granularity of access control.

In some embodiments, re-evaluation is based on the receipt of a token within the interval and access is denied if the token is not received within the interval. Advantageously, this provides improved resilience against attacks tampering with the re-evaluation of the access condition.

In some embodiments, re-evaluation is enforced by clearing the decrypted access key from a descrambler where it is held in a register in order to descramble media content. This is done by clearing the decrypted access key in response to a portion, for example a chunk, of the media content having been descrambled and preventing further use of the access key unless the access condition is re-evaluated. In some embodiments this is achieved by deleting the access key from a table where it is accessible to the descrambler once the content key has been loaded into the descrambler register from the table, or by storing the access key accessible to the descrambler in an encrypted form and changing the key used for this encryption and the corresponding decryption once the content key has been decrypted and loaded into the descrambler. Advantageously, this also provides improved resilience against tampering, in particular if combined with a token-based approach as described above.

Whether combined with a token-based approach or not, resilience may be further improved by providing some or all of these functions in a trusted execution environment and/or secure element. In some embodiments, descrambling and presentation of the media content is under overall control of a rich execution environment, which requests the trusted execution environment to re-evaluate the access condition as and when needed. By clearing the content key and preventing further access, for example in response to a portion of the content having been descrambled, the trusted execution environment thus enforces regular re-evaluation of the access condition.

At least the following embodiments and aspect of the invention are further disclosed:

1. A method for decrypting encrypted media content, the method comprising:
   receiving and storing an encrypted content key for decrypting encrypted media content;
   evaluating an access condition and, if the access condition is met, decrypting the content key and enabling a descrambler to use the content key to decrypt the encrypted media content;
   receiving the encrypted media content and decrypting the encrypted media content using the content key;
   re-evaluating within an interval whether use of the content key should remain enabled; and,
   if the re-evaluation is negative, preventing the descrambler from using the content key after the interval has passed in response to the re-evaluation.

2. A method as set out in item 1, wherein the access condition comprises a condition that a token has been received before expiry of the interval.
3. A method as set out in item 2, wherein the token is received from a remote location over a communications network and the re-evaluating comprises authenticating the token.
4. A method as set out in item 2 or item 3, wherein the re-evaluating comprises comparing the received token against an expected token and evaluating the access condition as met only if the received token matches the expected token.
5. A method as set out in any preceding item, wherein the decrypted content key is encrypted with a session key after decrypting it and stored for access by the descrambler; wherein
enabling the descrambler to use the content key includes decrypting the content key encrypted with the session key using the session key; and wherein
preventing the descrambler from using the decrypted content key comprises changing the session key without re-encrypting the content key.
6. A method as set out in any preceding item, wherein preventing the descrambler from using the decrypted content key comprises deleting the decrypted content key.
7. A method as set out in any preceding item, wherein use by the descrambler of the content key comprises storing the content key in a register of the descrambler and preventing the descrambler from using the decrypted content key comprises clearing the decrypted content key from the register.
8. A method as set out in item 7, wherein preventing the descrambler from using the decrypted content key comprises clearing the decrypted content key from the register in response to the interval having passed.
9. A method as set out in item 7 or 8, when dependent on item 5, wherein preventing the descrambler from using the decrypted content key comprises changing the session key in response to storing the decrypted content key in the register.
10. A method as set out in any preceding item, wherein enabling the descrambler to use the content key to decrypt the encrypted media content comprises storing the content key in a content key table accessible to the descrambler and wherein preventing the descrambler from using the content key comprises deleting the content key from the content key table.
11. A method as set out in item 10, wherein preventing the descrambler from using the content key comprises deleting the content key from the content key table in response to the descrambler loading the content key from the content key table.
12. A method as set out in any preceding item, the method comprising detecting the expiry of the interval by monitoring at least one of the group of:
an amount of data having been decrypted by the descrambler;
a change in an initialisation vector received for decrypting the media content in conjunction with the content key; and
a clock signal.
13. A method as set out in any preceding item, wherein at least one of the evaluating, re-evaluating, preventing, authenticating, comparing, changing, deleting, clearing and detecting, as the case may, be is implemented in a trusted execution environment.
14. A method as set out in any preceding item, wherein at least one of the evaluating, re-evaluating, preventing, authenticating, comparing, changing, deleting, clearing and detecting, as the case may be, is implemented in dedicated hardware.
15. A method as set out in any preceding item, wherein the access condition includes a condition on an output control status or an attack detection status and the re-evaluating includes detecting a change in output control status or detecting an attempt at circumventing access control.
16. A method of controlling decryption of encrypted media content in a client device from a remote server, the method comprising:
sending an encrypted content key and an access condition message to the client device, wherein the client device decrypts the content key to decrypt the media content with the content key;
evaluating a server-side condition to determine whether the client device should be able to continue to use the content key to decrypt the media content; and
only if the evaluation is positive, sending a token to the client device within an interval in response to the evaluating, wherein the client device prevents the use of the content key to decrypt the media content if the token is not received within the interval.
17. A method as set out in item 16, wherein the server-side condition comprises a condition on:
a period of time since a transaction authorising access to the media content was completed;
a period of time since the media content was first accessed;
a number of client devices associated with the same user account as the client device at which the content is being decrypted contemporaneously;
an access control attack notification having been received;
an output control notification having been received.
18. A method as set out in item 16 or item 17, the method comprising detecting the expiry of the interval by monitoring at least one of the group of:
an amount of data having been sent;
a change in an initialisation vector sent for decrypting the media content in conjunction with the content key; and
a clock signal.
19. A method of decrypting encrypted media content, the method comprising:
(a) receiving encrypted media content;
(b) receiving and storing an encrypted content key for decrypting the encrypted media content;
(c) evaluating an access condition and, if the access condition is met, decrypting the encrypted content key;
(d) storing the content key in a key table accessible to a descrambler
(e) accessing the content key in the key table and loading the content key to a register of the descrambler to decrypt media content associated with the content key;
(f) preventing further loading of the content key from the key table to the register;
(g) decrypting a portion of the encrypted media content with the content key in the register using the descrambler;

(h) in response to detecting that the portion has been decrypted, clearing the content key from the register; and
(i) repeating steps (c) to (h) to decrypt a next portion of the encrypted media content adjacent the portion of the encrypted media content.
20. A method as set out in item 19 and anyone of items 1 to 15, wherein the interval corresponds to the time it takes to decrypt the portion.
21. A method as set out in item 19 or 20, wherein the further loading is prevented in response to loading the stored content key.
22. A method as set out in any one of items 19 to 21, wherein steps (c) to (i) are implemented at least in part in a trusted execution environment and the encrypted content key is provided to the trusted execution environment from a rich execution environment in time for the next portion to be decrypted.
23. A method as set out in item 22, wherein step (c) is implemented in a secure element.
24. A method as set out in any one of items 19 to 23, the method comprising, prior to step (d), generating a session key for use by both a key encryption unit and by a key decryption unit and re-encrypting the decrypted content key with the session key using the key encryption unit,
wherein storing the content key in the key table comprises storing the content key re-encrypted with the session key in the key table,
wherein loading the content key to the register comprises decrypting the stored re-encrypted content key with the session key using the key decryption unit and storing the decrypted content key in the register, and
wherein preventing further loading of the content key comprises replacing the session key with a new session key without re-encrypting the content key, thereby preventing valid decryption of the content key stored in the content key table by the key decryption unit.
25. A method as set out in any one of items 19 to 24, wherein preventing further loading of the content key comprises deleting the content key from the key table.
26. A method as set out in anyone of items 19 to 25, wherein detecting that the portion has been decrypted comprises one or more of:
detecting that a predetermined amount of data has been decrypted;
detecting a change in an initialisation vector received for use with the content key to decrypt the media content; and
detecting a predetermined change in a clock signal.
27. A method as set out in anyone of items 19 to 26, wherein evaluating the access condition comprises determining whether an expected token authorising the decryption of the encrypted content key for the portion or next portion of the encrypted media content has been received.
28. A method as set out in item 27, wherein evaluating the access condition comprises determining whether an expected token authorising the decryption of the encrypted content key for the portion or next portion of the encrypted media content has been received fro a server over a communications network.
29. A device for decrypting encrypted media content, the device comprising a processing environment configured to:
receive and store an encrypted content key for decrypting encrypted media content;
evaluate an access condition and, if the access condition is met, decrypt the content key and enable a descrambler to use the content key to decrypt the encrypted media content
receive the encrypted media content and decrypt the encrypted media content using the content key;
re-evaluate within an interval whether use of the content key should remain enabled; and,
if the re-evaluation is negative, prevent the descrambler from using the content key after the interval has passed in response to the re-evaluation.
30. A device as set out in item 29, wherein the access condition comprises a condition that a token has been received before expiry of the interval.
31. A device as set out in item 30 the device comprising a communication interface for connecting the device to a communications network, wherein the token is received from a remote location over the communications network and the re-evaluating comprises authenticating the token.
32. A device as set out in item 30 or item 31, wherein the re-evaluating comprises comparing the received token against an expected token and evaluating the access condition as met only if the received token matches the expected token.
33. A device as set out in any one of items 29 to 32, wherein the processing environment is configured to re-encrypt the decrypted content key with a session key after decrypting it and to store the re-encrypted content key for access by the descrambler, wherein
enabling the descrambler to use the content key includes decrypting the content key encrypted with the session key using the session key; and wherein
preventing the descrambler from using the decrypted content key comprises changing the session key without re-encrypting the content key.
34. A device as set out in any one of items 29 to 33, wherein preventing the descrambler from using the decrypted content key comprises deleting the decrypted content key.
35. A device as set out in any one of items 29 to 34, wherein use by the descrambler of the content key comprises storing the content key in a register of the descrambler and preventing the descrambler from using the decrypted content key comprises clearing the decrypted content key from the register.
36. A device as set out in item 35, wherein preventing the descrambler from using the decrypted content key comprises clearing the decrypted content key from the register in response to the interval having passed.
37. A device as set out in item 35 or 36, when dependent on item 33, wherein preventing the descrambler from using the decrypted content key comprises changing the session key in response to storing the decrypted content key in the register.
38. A device as set out in any one of items 29 to 37, wherein enabling the descrambler to use the content key to decrypt the encrypted media content comprises storing the content key in a content key table accessible to the descrambler and wherein preventing the descrambler from using the content key comprises deleting the content key from the content key table.
39. A device as set out in item 38, wherein preventing the descrambler from using the content key comprises deleting the content key from the content key table in response to the descrambler loading the content key from the content key table.

40. A device as set out in any one of items 29 to 39, wherein the processing environment is configured to detect the expiry of the interval by monitoring at least one of the group of:
   an amount of data having been decrypted by the descrambler;
   a change in an initialisation vector received for decrypting the media content in conjunction with the content key; and
   a clock signal.

41. A device as set out in any one of items 29 to 40, the processing environment comprising a trusted execution environment configure to implement at least one of the evaluating, re-evaluating, preventing, authenticating, comparing, changing, deleting, clearing and detecting, as the case may be.

42. A device as set out in any one of items 29 to 41, wherein at least one of the evaluating, reevaluating, preventing, authenticating, comparing, changing, deleting, clearing and detecting, as the case may be, is implemented in dedicated hardware.

43. A device as set out in any one of items 29 to 42, wherein the access condition includes a condition on an output control status or an attack detection status and the re-evaluating includes detecting a change in output control status or detecting an attempt at circumventing access control.

44. A server for controlling decryption of encrypted media content in a client device remote from the server, the server comprising a processing environment configured to:
   send an encrypted content key and an access condition message to the client device, wherein the client device decrypts the content key to decrypt the media content with the content key;
   evaluate a server-side condition to determine whether the client device should be able to continue to use the content key to decrypt the media content; and
   only if the evaluation is positive, send a token to the client device within an interval in response to the evaluating, wherein the client device prevents the use of the content key to decrypt the media content if the token is not received within the interval.

45. A server as set out in item 44, wherein the server-side condition comprises a condition on at least one of:
   a period of time since a transaction authorising access to the media content was completed;
   a period of time since the media content was first accessed;
   a number of client devices associated with the same user account as the client device at which the content is being decrypted contemporaneously;
   an access control attack notification having been received;
   an output control notification having been received.

46. A server as set out in item 44 or item 45, wherein the processing environment is configured to detect the expiry of the interval by monitoring at least one of the group of:
   an amount of data having been sent;
   a change in an initialisation vector sent for decrypting the media content in conjunction with the content key; and
   a clock signal.

47. A device for decrypting encrypted media content, the device comprising a processing environment configured to:
   (a) receive encrypted media content;
   (b) receive and store an encrypted content key for decrypting the encrypted media content;
   (c) evaluate an access condition and, if the access condition is met, decrypt the encrypted content key;
   (d) store the content key in a key table accessible to a descrambler
   (e) access the content key in the key table and load the content key to a register of the descrambler to decrypt media content associated with the content key;
   (f) prevent further loading of the content key from the key table to the register;
   (g) decrypt a portion of the encrypted media content with the content key in the register using the descrambler;
   (h) in response to detecting that the portion has been decrypted, clear the content key from the register; and
   (i) repeat steps (c) to (h) to decrypt a next portion of the encrypted media content adjacent the portion of the encrypted media content.

48. A device as set out in item 47 and anyone of items 29 to 43, wherein the interval corresponds to the time it takes to decrypt the portion.

49. A device as set out in item 47 or 48, wherein the further loading is prevented in response to loading the stored content key.

50. A device as set out in any one of items 19 to 21, the device comprising a trusted execution environment configured to implement at least in part steps (c) to (i) and a rich execution environment configured to provide the encrypted content key to the trusted execution environment in time for the next portion to be decrypted.

51. A device as set out in item 50, the device comprising a secure element, wherein step (c) is implemented in the secure element.

52. A device as set out in any one of items 47 to 51, the processing environment being configured to, prior to step (d), generate a session key for use by both a key encryption unit and by a key decryption unit and to re-encrypt the decrypted content key with the cession key using the key encryption unit,
   wherein storing the content key in the key table comprises storing the content key re-encrypted with the session key in the key table,
   wherein loading the content key to the register comprises decrypting the stored re-encrypted content key with the session key using the key decryption unit and storing the decrypted content key in the register, and
   wherein preventing further loading of the content key comprises replacing the session key with a new session key without re-encrypting the content key, thereby preventing valid decryption of the content key stored in the content key table by the key decryption unit.

53. A device as set out in any one of items 47 to 51, wherein preventing further loading of the content key comprises deleting the content key from the key table.

54. A device as set out in anyone of items 47 to 53, wherein detecting that the portion has been decrypted comprises one or more of:

detecting that a predetermined amount of data has been decrypted;

detecting a change in an initialisation vector received for use with the content key to decrypt the media content; and detecting a predetermined change in a clock signal.

55. A device as set out in anyone of items 57 to 54, wherein evaluating the access condition comprises determining whether an expected token authorising the decryption of the encrypted content key for the portion or next portion of the encrypted media content has been received.

56. A device as set out in item 55, wherein evaluating the access condition comprises determining whether an expected token authorising the decryption of the encrypted content key for the portion or next portion of the encrypted media content has been received from a server over a communications network.

Further embodiments and aspects extend to computer program products comprising coded instructions, which, when run by a processor implement one or more of the methods as set out above. Yet further embodiments extend to one or more tangible computer readable media embodying one or more of these computer program products.

For the avoidance of doubt, where certain components, steps or processes are presented grouped into logical or notional components or functions, this is done for the sake of clarity of presentation, not limitation of an underlying implementation of these functions in software or hardcore (although such an implementation may of course follow these groupings). Further, the term "in response to" is used to encompass both a direct, indirect and delayed response. For example, changing the session key or deleting the content key in response to loading the content key into the descrambler encompasses using the reading from the key table rather than the writing into the register as the trigger. Likewise, sending the token from the server in response to evaluating a condition encompasses making the evaluation and then sending the token once requested from the client device. Reference to an interval includes a regularly recurring interval of equal duration, or intervals may vary from one interval to the next. An interval may be defined in terms of an amount of data decrypted or sent, in which case there be a corresponding time period that may vary due to factors such as data rates. Conversely, intervals may be defined in terms of time periods or durations, in which case there may be corresponding amounts of data that may vary from one interval to the next.

BRIEF DESCRIPTION OF THE DRAWINGS

Various embodiments are now described by way of example for the purpose of explanation and illustration, with reference to the accompanying drawings in which:

FIG. 1A illustrates a conditional access system comprising a conditional access server communicating with content consumption client devices over a communications network;

FIG. 1B illustrates in further detail one of the content consumption client devices;

DETAILED DESCRIPTION OF EMBODIMENTS

Figure 2:
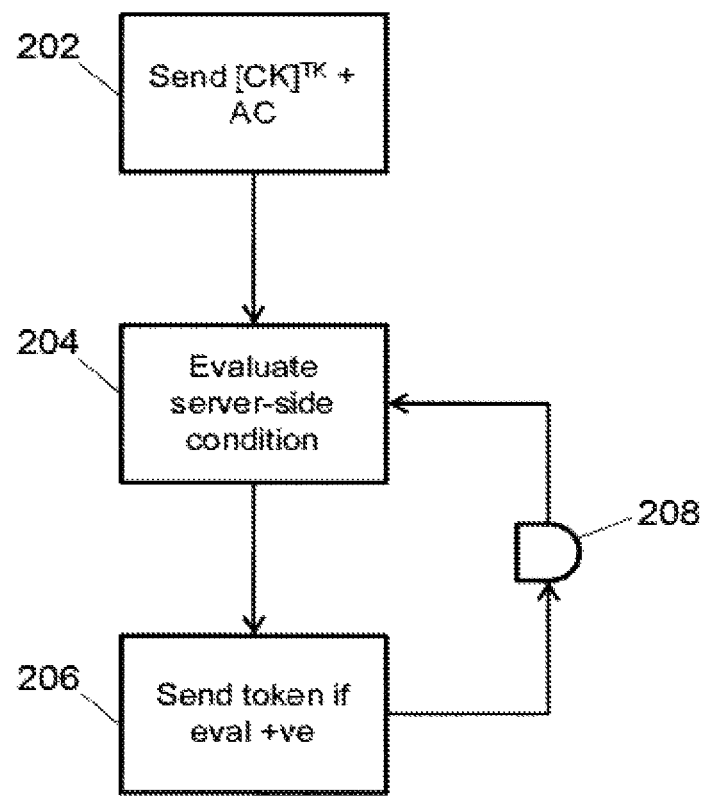
FIG. 2 illustrates a server-side conditional access process including token transmission.

With reference to FIG. 1A, a conditional access server 102 has a processing environment and communications interface and communicates over a communications network 104, for example the Internet, with a number of content consumption client devices 106, which implement conditional access functionality. In some embodiments, the communication network 104 and conditional access server 102 (as well as any separate content server) are not under the control of the same entity. This is commonly referred to as over the top OTT provision of content. In other embodiments, the communication infrastructure for the communication network 104 and content provision is under the control of the same entity, for example an Internet service provider. In yet other embodiments, the communications network is a dedicated broadcast network, for example a satellite or cable network. In those circumstances, the conditional access server 102 is typically provided at the cable or satellite headend. Transmission of the content may be by broadcast, multicast, pointcast or on request.

The conditional access server 102 provides a content key CK and access condition AC for a given content or stream to the client devices 106. The CK and AC may be provided in a variety of different formats but are, typically, provided together in an entitlement control message ECM. The CK is provided encrypted with a transport key TK as $[CK]^{TK}$ (generally, the notation $[x]^y$ is used herein to indicate clear text x encrypted with key y) and the AC is provided in a form so that it can be authenticated by the client device 106. The conditional access server 102, in some embodiments, also provides encrypted media content, for example in the form of an encrypted media stream, to the client devices 106. In other embodiments, encrypted media content is provided by a separate server, not illustrated in FIG. 1A. Specifically, media content provided to the client devices 106 encrypted with a content key CK is referred to as $[\text{media content}]^{CK}$. Various digital video transmission standards may be used for transmitting the media content, for example MPEG-DASH.

In some embodiments, the conditional access server 102 has access to a subscriber database containing subscriber information, such as the content a subscriber is authorised to access, the identity and/or number of client devices a subscriber may use to access the content, and so forth. This information is used by the conditional access server to determine content consumption rights for a given user and to generate a CK and AC accordingly, for example in the form of an ECM. In some embodiments, the conditional access server 102 is configured, by way of a suitably programmed general purpose or dedicated processor, to periodically verify conditions for continued access by a client device 106 to a given content and transmit a token to the client device 106 indicating that continued access is authorised.

The conditions may include a check whether licensing conditions are complied with, such as the number of client devices 106 associated with a given user consuming the content, a period of time since a transaction authorising access to the content was completed, a period of time since the content was first accessed, and so forth. The conditions may also include a check on other feedback signals, such as a tamper alarm providing an alert regarding the likelihood of an attempt at circumventing access control at the client device 106 or a signal indicating a change in an output control status at the client device 106. An example of a change in output control status is in the context of a set top box being connected to a TV screen using a HDMI (High-Definition Multimedia Interface) cable, with content being protected in transit over the HDMI cable using the HDCP (High-bandwidth Digital Content Protection) protocol. A relevant output status change would, for example, be a change in the status of the HDCP protection, for example HDCP being disabled.

The periodic verification may take place at predetermined intervals, for example determined by an elapsed time period, by an amount of data transmitted or consumed or by a change in cryptographic information (such as an initialisation vector IV for use in conjunction with the CK to decrypt the content). Specifically, in some conditional access implementations, the IV is a random number known to the client device 106, which changes from one data portion (often referred to as a chunk) to the next, for example by adding the size of the previous chunk to the previous IV value. This change in the IV prevents a compromised device from simply treating the whole content as one portion/chunk and can further be used to trigger periodic verification and/or the periodic rendering unuseable of a stored CK, as described for some embodiments below in detail.

With reference to FIG. 1B, an embodiment of a client device 106 is now described. The client device can, for example, be a set-top-box without a display, an integrated receiver decoder, an integrated television, a personal computer, or a mobile device such as a smart phone or tablet. The client device 106 comprises a network communication interface 108, a rich execution environment REE 110, which comprises the device normal operating system, a network communications adapter, user interface functionality, graphics and video functionality and, according to some embodiments, a portion of a content processing and descrambling module for processing and outputting decrypted content to the user or to a video/display processor for further processing, in conjunction with content access functionality implemented in a trusted execution environment TEE 112.

The TEE 112 provides an execution environment that runs alongside and is isolated from the REE 110. The TEE 112 is configured to protect its assets from general software attacks and defines rigid safeguards as to data and functions that a program can access from outside the TEE 112. A TEE is a secure area that ensures that sensitive data is stored, processed and protected in a trusted environment. A TEE's ability to offer safe execution of authorized security software, known as 'trusted applications', enables it to provide end-to-end security by enforcing protection, confidentiality, integrity and data access rights. The 112 further implements functionality which provides the CK to a descrambler, evaluates periodically whether access to the content is to be maintained, and prevents the descrambler from using the CK to decrypt the encrypted media content if the evaluation is negative.

In some embodiments, the TEE 112 further comprises a secure element SE 114, which implements those functions requiring the highest degree of security, for example the evaluation and authentication of the AC and the decryption of the CK. A SE provides enhanced security using software and tamper resistant hardware. It allows high levels of security and can work together with a TEE. The SE may include a platform onto which applications can be installed, personalized and managed. It comprises hardware, software, interfaces, and protocols that enable the secure storage of certificates and execution of applications, such as for access rights evaluation. The SE may be implemented in different forms such as a Universal Integrated Circuit Card (UICC), or a device linked by NFC (Near Field Communication). The SE may be provided as a separate chip or secure device, which can be inserted into a slot of the client device 106. The SE can also be provided embedded in the client device 106. The SE may include one or more security domains, each of which includes a collection of data that trust a common entity (i.e., are authenticated or managed using a common or global cryptographic key or token).

Specifically, according to some embodiments, the TEE 112 provides access to the CK for the descrambler by:
  decrypting the received encrypted CK and storing it in clear text in a CK table accessible to the descrambler to load the CK into a corresponding register;
  decrypting the received encrypted CK, re-encrypting it with a session key SK and storing it in the table in that form, in conjunction with providing a mechanism to load the CK into the register that includes decrypting the CK in the table with the SK.

In either embodiment, the TEE 112 implements one or more of the following to prevent access of the descrambler to the CK:
  delete the CK from the CK table in response to loading the CK into the register, or at another point in time between evaluations;
  change the SK available for loading the CK or globally without re-encrypting the CK stored in the table, thereby rendering the CK unusable with the new SK, in response to loading the CK into the register, or at another point in time between evaluations;
  clear the CK from the register periodically, thereby forcing re-evaluation of the AC to re-decrypt the CK in time for when the CK is cleared (or shortly thereafter so as not to affect decryption), so that the CK can be loaded again into the register.

In some or all of these embodiments, some or all of these functions are implemented in dedicated hardware to further reduce the risk of a successful attack on the conditional access system. Further, in some embodiments, a portion of the described functionality, in particular regarding the maintenance and clearing of the register, may be implemented in the TEE 112, in some embodiments in dedicated hardware.

The periodic evaluation of whether access is to be maintained or not is done, depending on the embodiment, based on device internal criteria inside the TEE 112, or may be done server side, in which case the periodic evaluation includes testing for the receipt of an authenticated token from the server 102 over the communications network 104 by the communication modules in the REE 110 and evaluation of the token in the TEE 112 or SE 114. Of course, in some embodiments, both approaches are combined.

With reference to FIG. 2, a server-side process in accordance with a specific embodiment is now described. At step 202, the server 102 sends an encrypted content key $[CK]^{TK}$ encrypted with a transport key TK over the communications network 104 to the client 106, together with access condition(s) AC that determine whether the client device 106 may decrypt CK with TK (the latter being already present in the client device 106). At step 204, the server 102 evaluates a server-side continued access condition, for example including one or more of the conditions discussed above, and, at step 206, sends an authenticated token over the network 104 to the client device 106, to enable the client device to benefit from continued access to the continent corresponding to CK. If the evaluation is negative, the token is not sent and the client device 106 will discontinue access, as discussed below. Subsequent to sending (or not sending) the token, a delay 208 is implemented such that steps 204 and 206 are sufficiently synchronised with the expectation of a token at the client device 106 to ensure continued access while evaluation at step 204 is positive. The delay may be implemented in terms of a time, an amount of data sent by the server 102 to the client device 106, an estimate of the amount of data decrypted by the client device 106 to present corresponding content, a change in an IV sent to the client device 106 from server 102 or other server for use in decrypting the content in conjunction with CK or an estimate of when a locally generated IV at the client device 106 may change. Further, in particular in the context of OTT implementations, the client device 106, in some embodiments, regularly requests new data (rather than the data being pushed to the client device as for example in a broadcast context), and this request for data triggers and/or synchronises the sending of the token by the server 102.

Figure 3:
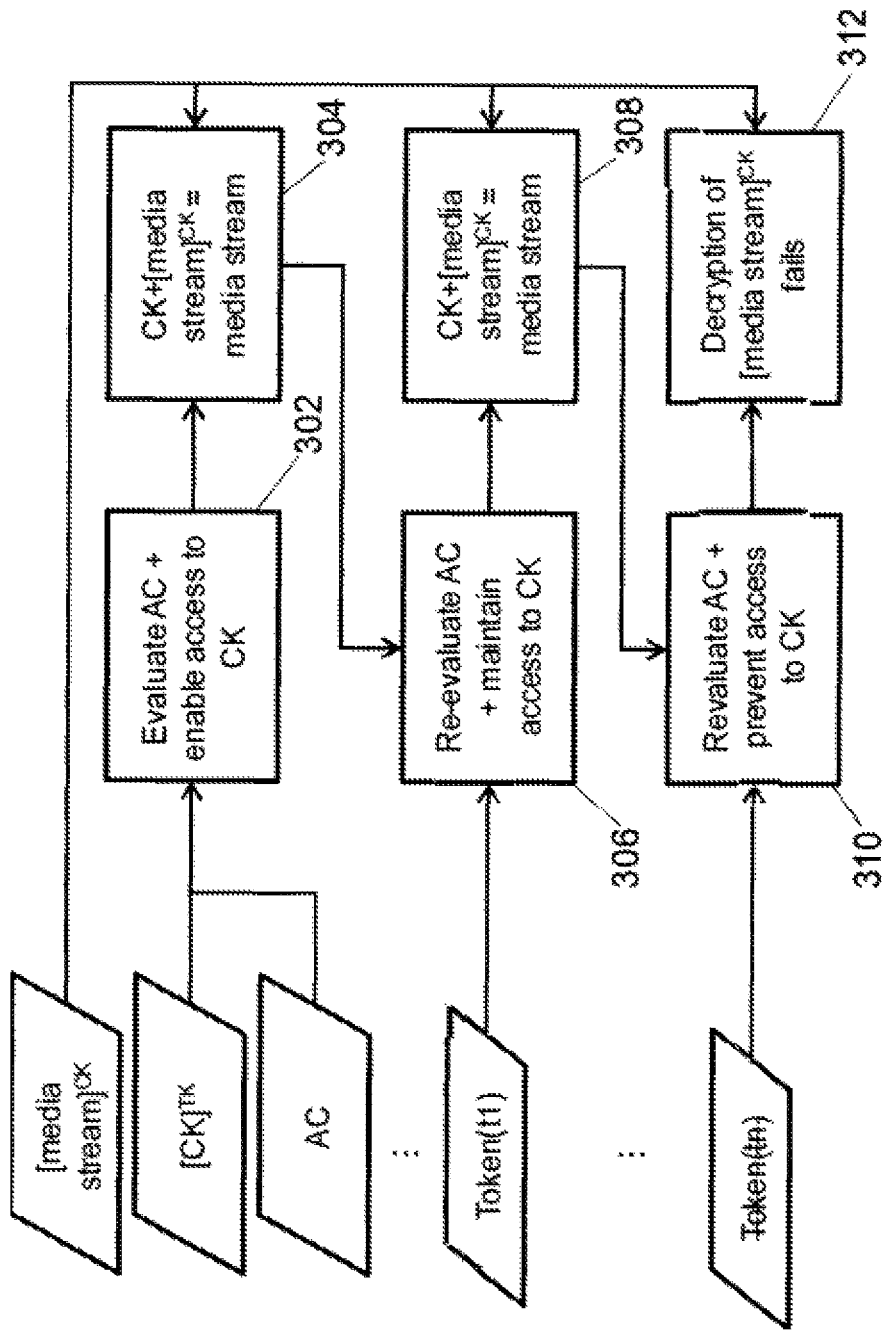
FIG. 3 illustrates a corresponding client-side process.

With reference to FIG. 3, a corresponding client-side process is now described. At step 302, the received AC is authenticated and evaluated and, in the event of a positive evaluation, access to the CK is enabled for the descrambler at step 302, with the encrypted media content being decrypted by the descrambler using the CK, as described above, at step 304. After a predetermined interval, for example a predetermined period of time determined by a clock signal, a predetermined amount of data having been decrypted at step 304, a change in an IV received or generated, and so forth, that this at a time t1 the AC is re-evaluated at step 306 and, in case of a positive determination because a token has been received in time for the interval ending at t1, content continues to be decrypted at step 308. This re-evaluation is carried out at each interval. If at a re-evaluation at time t0 at step 310 the re-evaluation is negative because no token has been received in time for tn, the decryption of the media content fails at step 312. It will be understood that the initial in evaluation of the AC may different from subsequent re-evaluations, for example the re-evaluations may only check for the receipt of an authenticated token since the last re-evaluation. Equally, in some embodiments, the re-evaluation may be exclusively, or in part, be based on internal factors inside the client device 106, with or without reliance on receipt of a token.

In order to allow further access, the received token must match an expected token. While in some embodiments the token is of a fixed value known to both the server 102 and the client device 106, the security of token evaluation can be improved by changing the token from time to time, for example alter each evaluation, in a way that can be predicted by the client device 106. For example, a counter increment or timestamp could be used to change the token between evaluations or the token can be generated or derived by any suitable cryptographic method that is synchronised between the server 102 and the client device 106.

Figure 4A:
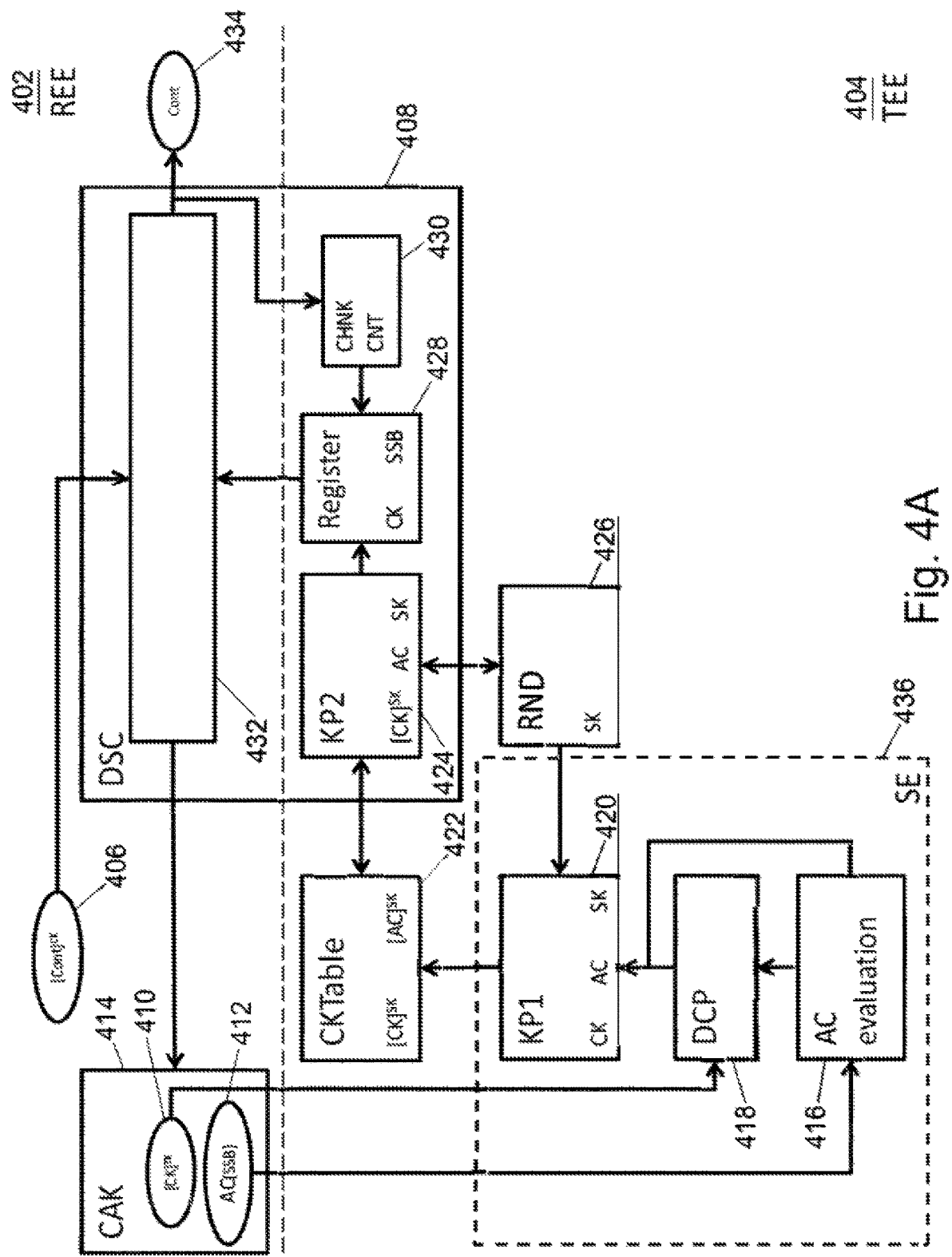
FIG. 4A illustrates a specific embodiment of a content consumption device on which processes including a process as illustrated in FIG. 3 can be implemented.

With reference to FIG. 4, a specific embodiment of a client device 106 is now described. It will be appreciated that this embodiment can be used as a specific implementation of the embodiments described above, to implement the specific methods described above, and in particular to periodically reevaluate access rights by means of receipt of a token or otherwise. However, the embodiment is more widely applicable in any context in which it is desirable to enforce periodic re-evaluation of access conditions in a conditional access system, in particular in an OTT context.

In this embodiment the client device 106 comprises a REE 402 and a TEE 404. The REE is configured to receive encoded content 406 for descrambling by a descrambler 408 and corresponding CK and AC 410, 412 for storage in a conditional access kernel 414. CK 410 is encrypted with a transport key TK and AC 412 comprises a flag referred to as a secure stop bit SSB herein, which indicates whether the availability of the CK is subject to periodic enforcement of a re-evaluation of the AC (or part of the AC, for example relating to the periodic receipt of a token) or not. This will be discussed in further detail below. The conditional access kernel 414 is configured to request evaluation of the AC and decoding of the CK in coordination with the encoded content 406 being provided to the descrambler 408 by the REE 402, on request from the descrambler 406, periodically triggered by an amount of data having been sent to or been decoded by the descrambler 406, for example in good time for the end of a chunk, or in response to a change in a received or generated IV. In some embodiments the REE controls the pushing of a next content chunk to the DSC 408 for descrambling as well as sending the CK and AC to the TEE and synchronises these operations, for example sending the CK and AC in good time for when the next chunk is required and then, at the appropriate time and once the CK is ready in the CKTable 422, pushing the next chunk to the DSC 408 for descrambling.

The TEE 404 implements an AC evaluation module 416 configured to evaluate an AC passed to it by the conditional access kernel 414 for evaluation and a key decryption module 418 in possession of the TK and configured to decrypt $[CK]^{TK}$ passed to it from the conditional access kernel 414 if cleared to do so by the AC evaluation module 416. A first key protection module 420 is configured to receive the decrypted content key CK from the key decryption module 418 and to encrypt it with a session key SK, discussed further below. The first key protection module is also configured to encrypt AC with SK in some embodiments. A key table 422 is configured to receive the re-encrypted content key $[CK]^{SK}$ and encrypted access condition $[AC]^{SK}$ from the first key protection module 420 and to store $[CK]^{SK}$ and $[AC]^{SK}$. By storing both CK and AC (which includes the SSB), the key table 422 can store CKs that are subject to periodic re-evaluation of access rights and those that are not, since the SSB will indicate to the relevant modules how the CK should be handled.

The TEE 404 further implements a second key protection module 424 configured to read $[CK]^{SK}$ and $[AC]^{SK}$ from the key table 422. As will be described below, to force periodic re-evaluation of the AC, the SK is changed periodically, so that each new SK needs to be negotiated and synchronised between the key protection modules 422 and 424. To this end, each key protection module, or only one of them as appropriate, can request a new SK from an SK generator 426. The SK generator 426 comprises a random or pseudo-random number generator to generate the SK. The SK generator 426 communicates the new SK to the key protection modules once it is generated. In some embodiments the SK generator 426 is incorporated in one of the key protection module and the key protection modules communicate directly to negotiate each new SK. In some embodiments each key protection module has a copy of the same predictable number generator and the key protection modules negotiate when to generate a new SK and then each key protection module generates the next value independently.

The second key protection module 426 is further configured to decrypt the CK and AC, to extract the SSB from the AC and to store the CK and SSB in a register 428 of the descrambler 408. A chunk counter 430 is configured to monitor an amount of data decoded by a decoding unit 432 (in some embodiments implemented in the REE 402). The decoding unit 432 is configured to decode the encrypted content 406 to output "clear text" digital video content 434 for downstream processing by a video processor and display to a user of the client device 406) and to clear the register 428 when a predetermined amount of data has been decoded, eg after decoding each chunk. In alternative embodiments, a change in IV used in conjunction with the CK is monitored and used to trigger clearing of the register 428. In yet other embodiments, a clock signal is used for this purpose. It will be understood that the conditional access kernel 414 is adapted accordingly, so that the AC is re-evaluated to store a new $[CK]^{SK}$ in the key table in time for the key protection module to re-stock the register 428 with the CK.

In some embodiments, the second key protection module 424 is configured to read $[CK]^{SK}$ and $[AC]^{SK}$ from the key table 422 in response to a request from the descrambler when the register 428 needs an AC written or re-written to the register 428. In other embodiments, the key protection module 424 reads $[CK]^{SK}$ and $[AC]^{SK}$ from the key table 422 in response to them being stored there, for example triggered by a signal from the key protection module 420. The CK and SSB are then inserted in the register 428 on detection that the register has been cleared, in response to a signal from the chunk counter 430 indication that the register has been cleared, or in response to a signal from the descrambler 408.

Figure 4B:
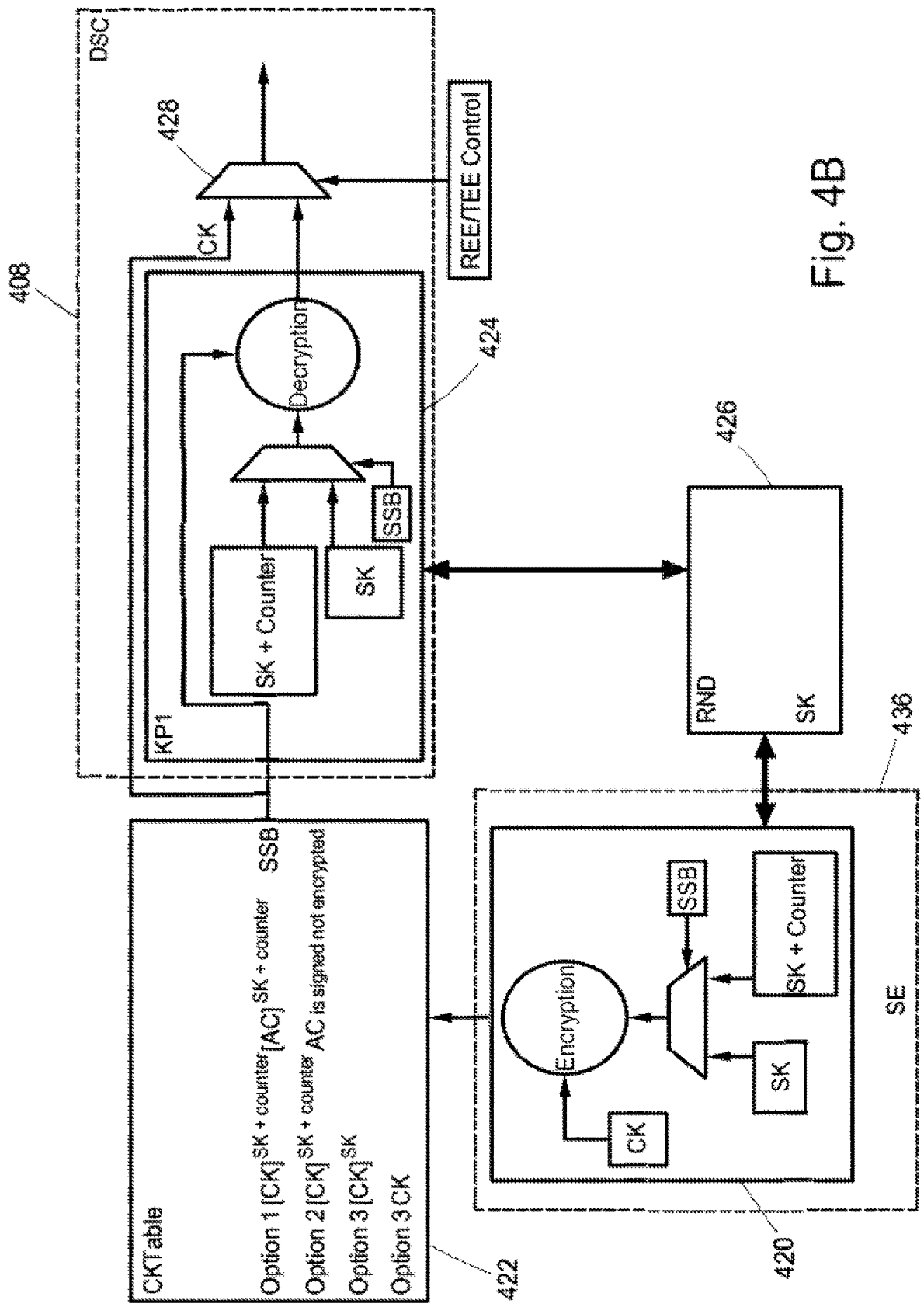
FIG. 4B illustrates how components illustrated in FIG. 4A, in some embodiments, are adapted to handle a number of levels of key protection.

In some embodiments, the key table 422 stores a content identifier for each CK, identifying the corresponding content with which the CK is associated. A number of implementations, as illustrated in FIG. 4B, are then possible to store CKs with differing protection levels:

All CKs are stored encrypted with the same SK and require decryption by the second key protection module 422. There is a global SK, meaning that the REE must request fresh decryption and re-encryption of CK with the current SK each time the relevant CK is to be provided to the descrambler 408 to decrypt a given content, irrespective of whether the SSB is set or not. For those CK where the SSB is set, the CK will be cleared from the descrambler 408 at the end of each chunk and the REE must request decryption and re-encryption each time it pushes a new chunk to the descrambler 408.

CKs for which the SSB are set are stored encrypted with the same global SK that changes periodically, for example in response to a chunk end as described above. For these CKs, the REE requests decryption and re-encryption of the CK each time the descrambler 408 requires a fresh CK (for each new chunk, as the SSB is set). Since the decryption and re-encryption of the CK is triggered just before the CK needs to be inserted in the descrambler 408, the SK can change globally due to the short validity period that is required for $[CK]^{SK}$. In implementations where this requirement is relaxed and longer validity periods are required for $[CK]^{SK}$, an index of the correct SK has to be maintained for each content, for example in the key table 422. For example, in some implementations, the change in the SK is achieved by incrementing the SK with a counter upon renegotiation or periodically and an index to the correct value of the counter is maintained in the key table 422 for each CK/corresponding content CKs for which the SSB is not set are stored in clear text.

As in the preceding implementation, CKs for which the SSB are set are stored encrypted with the same global SK that changes periodically. The change may be by renegotiation or by adding a counter to the SK, as above. CKs for which the SSB is not set are stored re-encrypted with a different SK that does not change or changes less frequently. In implementations where the SK change is achieved by a counter as described above, the different SK could be the SK without the counter added. The different, static SK could alternatively be a separate SK negotiated by the key protection modules 420 and 424 for non-SSB CKs. In either case, the SK (or all SKs as the case may be) may be re-negotiated periodically (but less frequently), or may be re-negotiated at device start-up, to force re-evaluation of all keys.

In all of these options, the AC may be stored in clear text in the key table 422 so that the SSB is accessible, or the AC may be stored encrypted with, for example the SK or an incremented version of it, along with the SSB being stored separately to be accessible to the second key protection module 424 without knowledge of the SK (or the correct version of it). The AC may be signed by a cryptographical method to protect against its modification. For example, the AC and CK may be concatenated and the result encrypted with an algorithm using a chaining mode (e.g. AES in CBC mode (Advanced Encryption Standard in Cipher Block Chaining mode) using, for example, SK as the key. In another example, the AC is signed with a MAC (Message Authentication Code), AES CGM (Galois/Counter Mode) or AES ECC (Elliptic Curve Cryptography) algorithm.

In some embodiments, AC evaluation module 416 and key decryption module 418 are implemented in a secure element 436. In some embodiments, the AC, for example in the form of an ECM, is provided to the secure element 436 by way of a smart card and corresponding reader and the evaluation of the ECM and decryption of the CK is done in the secure element 436. In some embodiments, the first key protection module 420 is also implemented in the secure element 436.

Figure 5:
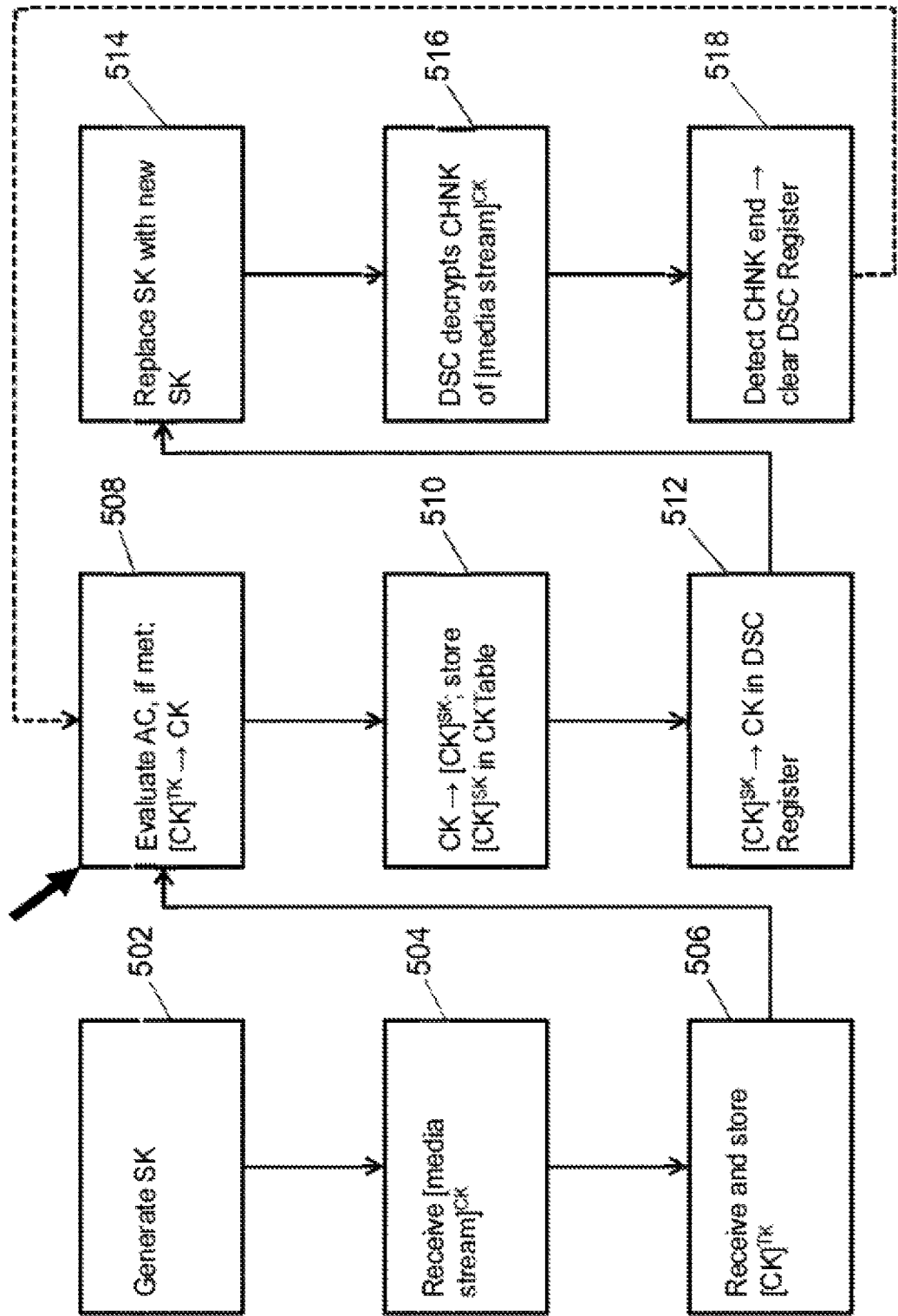
FIG. 5 illustrates a process for operating the content consumption device of FIG. 4A.

With reference to FIG. 5, the operation of embodiments described above with reference to FIG. 4A is now described, in case the SSB is set so that period enforcement of re-evaluation of the AC is enabled. At step 502, an SK is generated. In most of the described implementations (see above) a global SK is generated (and may be used together with a counter, as described above). A SK is first generated on boot up of the client device 106 and may then renegotiated periodically, as described above. At step 504 an encrypted media content is received and at step 506 a CK and AC are received and stored by the conditional access kernel 414.

At step 508, the conditional access kernel 414 sends the AC to access evaluation module 416 and the CK to the decryption module 418 to trigger and evaluation of the AC and, if the evaluation is positive, the decryption of the CK. At step 510, the decrypted CK is passed to the first key protection module 420 to encrypt the CK with the SK and store the result in the key table 422. At step 512, the CK is read and decrypted by the second key protection module 424 using the session key SK, and the result is stored in the register 428. In addition, the second key protection module 424 also stores the SSB in the register to indicate that re-evaluation of the AC is being enforced. In response to the reading and/or storing, a new SK is negotiated and replaced in the key protection modules 420 and 424 at step 514. For example, in some embodiments, the second key protection block 424 triggers this re-negotiation in response to reading and/or storing the CK. At this stage, if the CK needs to be placed in the register 428 again, the process of steps 508 to 512 needs to be repeated in order to store CK encrypted with the new SK in the key table 422 to enable it being decrypted and stored in the register 428 by the second key protection module 428.

At step 516, a chunk or other predefined portion (predefined amount of data, a portion between two changes of IV) of the encrypted data stream is decrypted by the decryption module 432 using CK in the register 428 and output for processing and display downstream. At step 518 the chunk counter 430 detects that the predetermined portion of content has been decoded and, in response to that clears the CK from the register 428 if the SSB is present in the register 428, thereby preventing further decoding of the content 406 unless the AC is evaluated again and the subsequent steps 508 to 512 are repeated to make $[CK]^{SK}$ encrypted with the new SK available to the second key protection block 424 again. Therefore, in order to continue decoding the content 406, the process loops back to step 508. To this end, the re-evaluation of the AC (and subsequent decryption of the CK, if successful) is triggered by the conditional access kernel 414 sending $[CK]^{TK}$ and AC to the decryption and access evaluation modules 416, 418, respectively, in response to a request from the descrambler 408 or, for example, in response to the conditional access kernel 414 independently requesting re-evaluation, for example based on monitoring IV changes or an amount of data input to or output from the descrambler 408.

The above description is made in terms of a process when enforced re-evaluation of the AC is enabled, that is the SSB is set to a value indicating that this should be enabled, eg 1. In the event that the SSB is set to disable enforced re-evaluation, eg set to 0, the process described above with reference to FIG. 5 is modified in that, at step 514 one or more of the following alternative actions are taken:

the trigger for renegotiation of SK in the second key protection module 424 is suppressed, so that SK is not renegotiated in response to the second key protection module reading $[CK]^{SK}$ from the key table 422 (although renegotiation may occur at other times);
on renegotiation of the SK, $[CK]^{SK}$ is reencrypted so that it remains accessible with the current SK;
a global SK (which is not changing) is used for all content for which the SSB is not set/set to 0; a new SK is produced by incrementing the SK by a counter each time a new SK is required for content for which the SSB is set/set to 1;
the key protection modules 420, 424 act to merely pass through a clear text version of CK (involving also a modification of step 510), which is stored and remains accessible in the key table 422.

Further, additionally or alternatively, in dependence on the embodiment, the register 428 is only cleared at step 518 if an active SSB, eg with value 1, is stored in it, as described above, and otherwise retains the CK until the content changes or the client device 106 is rebooted.

Figure 6:
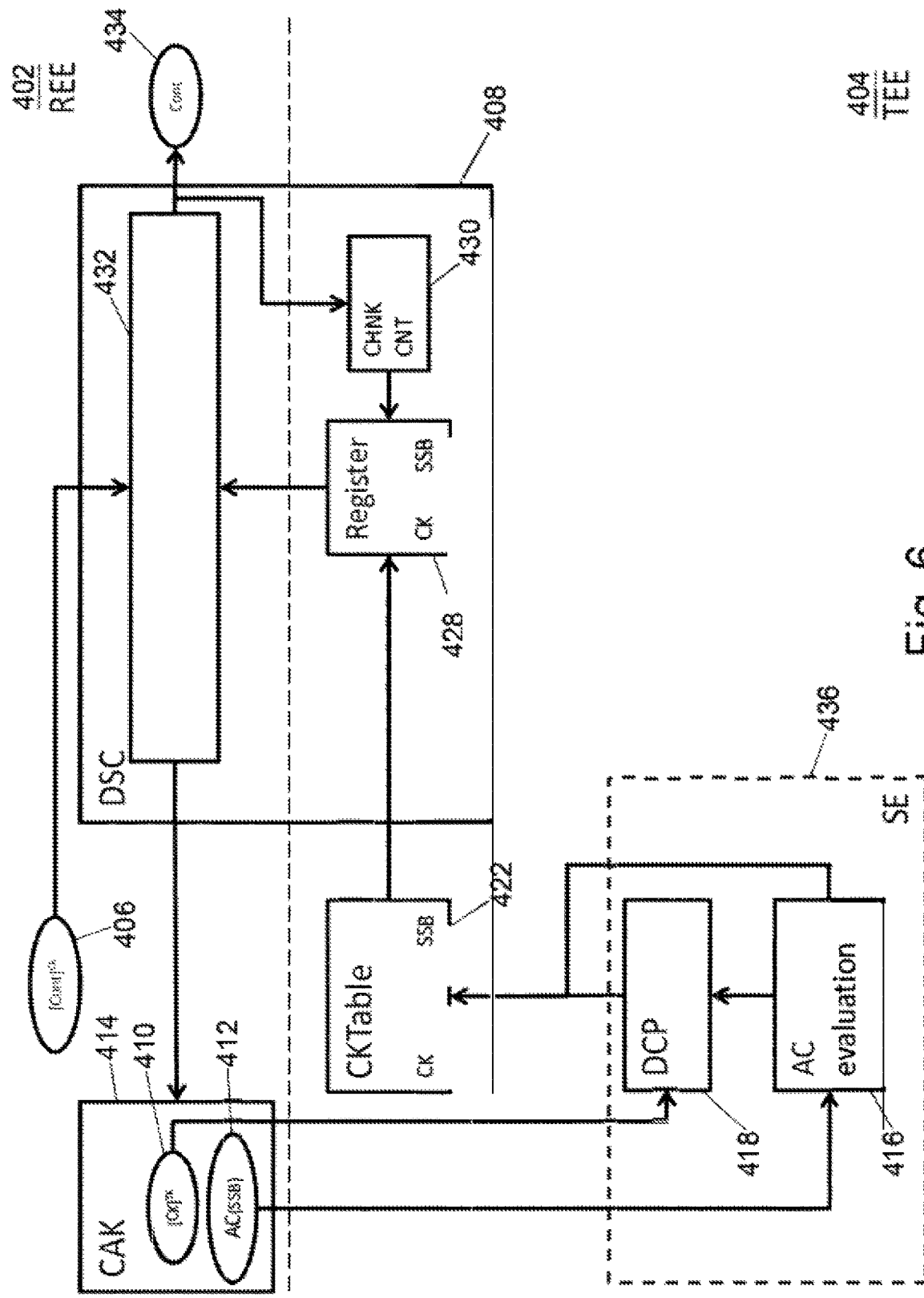
FIG. 6 illustrates an alternative specific embodiment of a content consumption device.

With reference to FIG. 6, an alternative specific embodiment is now described, which, in overview, removes the key protection modules 420 and 424 and the SK generator 426 described above with reference to FIG. 4, and the corresponding periodic renegotiation of SK, and instead enforces re-evaluation of the AC by periodic deletion of CK from the key table 422. However, in yet a further embodiment, key protection using SK together with SK renegotiation and deletion of CK from the key table 422 are combined and both occur to enforce periodic re-evaluation of the AC.

Specifically, turning to FIG. 6, in which the various modules have retained their reference numeral used above in describing embodiments with reference to FIG. 4, the functionality of the key table 422 has changed in that it receives and stores the CK and SSB in clear text. The functionality of the descrambler 408 has changed in that it reads the CK and SSB directly into the register 428 and triggers the deletion of CK in the key table 422, responsive to that. In some embodiments the deletion and/or its trigger are implemented in dedicated hardware for added security and resilience against attacks to circumvent the periodic re-evaluation of AC. Modules 420, 424 and 426 are not present.

Figure 7:
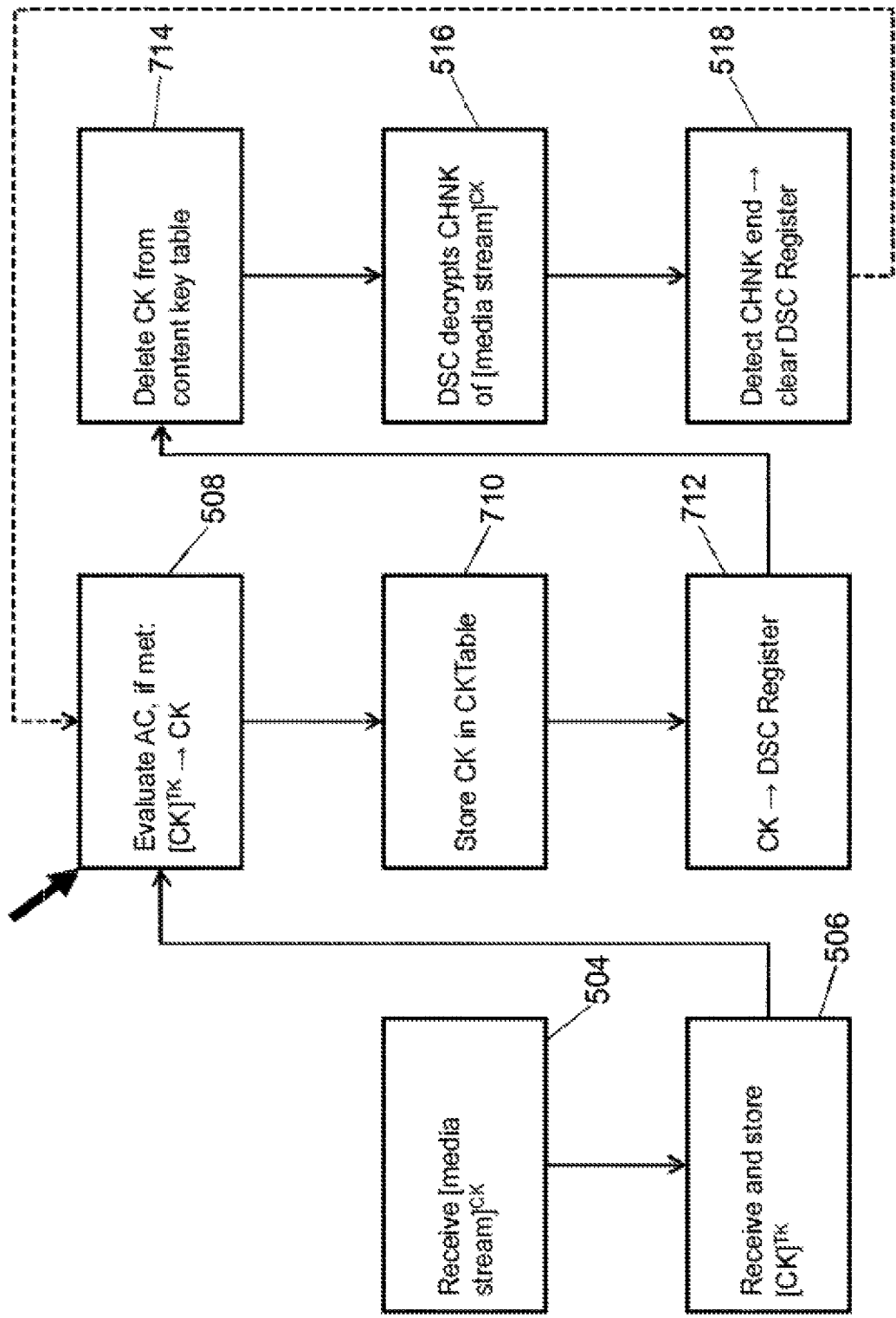
FIG. 7 illustrates a process for operating the content consumption device of FIG. 6.

With reference to FIG. 7, a process implemented using the specific embodiment just described with reference to FIG. 6 is now described. The process is similar to the process described above with reference to FIG. 5 and like reference numeral are used for like process steps. Step 506 is omitted and steps 510 to 514 have been modified and will be referred to as steps 710 to 714, respectively. Specifically, these steps are changed in light of the replacement of renegotiation of a SK with deletion of a clear text CK from the key table 422. Describing, then, the differences in FIG. 7, at step 710 CK is stored in the key table 422 in clear text and read into the register 426 at step 712. At step 714, the CK is deleted from the key table 422 in response to the CK having been read into the register 426. It will be understood that in embodiments that combine the two approaches, the process described above with reference to FIG. 5 is modified in that in addition to the steps of that process, enforced deletion of the CK from the key table 422 occurs at some point in the process.

It will be understood that the specific embodiments described above with reference to FIGS. 4 to 7 are suitable in any context in which periodic re-evaluation of an AC should be enforced, in particular if the corresponding CK has a prolonged period of validity and is stored persistently in the client device, as is the case in OTT applications. The re-evaluation of the AC may be based on conditions local to the client device 106 and/or may rely on the receipt of a token from a conditional access server 102, as discussed above. In some embodiments, the AC is such that all but the receipt of token condition are evaluated only once at an initial step, with subsequent evaluations only requiring receipt and authentication of the token. In some embodiments, the conditional access is fully under the control of the server 102 and the AC at the client only requires the continued presence of an authenticated and up to date token at the client device to provide continued access to the CK to the descrambler 408.

Various modifications, combinations and juxtapositions of the features described above that are within the scope of the appended claims will occur to a person skilled in the art. To take a few examples, the SSB may be received and/or stored independently and/or separately from the AC, in which case the AC is not stored in the key table in some embodiments. The descrambler may be fully implemented in either the TEE or the REE, rather than straddling the two. In fact, all modules described may be implemented in either the TEE or REE depending on level of security required. Where the AC remains associated with the SSB, in the relevant embodiments it may be stored encrypted or in clear text in the second key protection module, or may be discarded with only the SSB stored in the second key protection module. Indeed, the AC and/or SSB may be stored elsewhere accessible to the second key protection module. More generally, where the location of storage of a particular quantity is referred to above, this is to be understood as a logical connection of accessibility, rather than a physical location, in some embodiments.

Similarly, while a specific way of coordinating the negotiation of the SK between the key protection modules and the SK generator have been described above, it will be understood, that there are many possibilities for implementing this, including direct communication between these modules in addition to or instead of communication with the SK generator. Further, in embodiments described above, the register of the descrambler holding the CK is periodically cleared. This provides an arbitrary granularity in the enforcement of the re-evaluation of the AC and/or the receipt of a token by setting the periodicity accordingly. In alternative embodiments providing less control over the granularity of enforcing re-evaluation of the AC and/or the receipt of a token, the register content is only overwritten/changed when the content to be descrambled changes or the device is powered down, in which case re-evaluate of the AC can only be guaranteed on device start-up or when starting to descramble new content.

In general, it will be understood that while the described embodiments are disclosed in different groupings and modules, some embodiments mirror the described groupings in terms of physical implementation, possibly with the implementation in dedicated hardware of some or all of the groupings and modules, while other embodiments regroup the described functionalities in different physical arrangements and the described modules and groupings are to be understood as logical groupings for the purpose of clarity of explanation of the associated functions, rather than for the purpose of limitation. Thus the described functions can be grouped differently in logical or physical groupings. Whether pertaining to the REE or TEE, the described functions can be implemented in one or more of software, firmware, middleware or hardware according to various embodiments. It will be understood that the above description has been made for the purpose of explanation of various embodiments and the disclosed techniques and not for the purpose of limitation of the scope of the appended claims.

The invention claimed is:

1. A method for decrypting encrypted media content, the method comprising:
    receiving and storing an encrypted content key for decrypting encrypted media content;
    evaluating an access condition and, if the access condition is met, decrypting the content key and enabling a descrambler to use the content key to decrypt the encrypted media content;
    receiving the encrypted media content and decrypting the encrypted media content using the content key;
    re-evaluating within an interval whether use of the content key should remain enabled; and,
    if the re-evaluation is negative, preventing the descrambler from using the content key after the interval has passed in response to the re-evaluation even though the content key remains valid.

2. The method according to claim 1, wherein the access condition includes a condition that a token has been received before expiry of the interval.

3. The method according to claim 2, wherein the token is received from a remote location over a communications network and the re-evaluating comprises authenticating the token.

4. The method according to claim 2, wherein the re-evaluating comprises comparing the received token against an expected token and evaluating the access condition as met only if the received token matches the expected token.

5. The method according to claim 1, wherein the decrypted content key is encrypted with a session key after decrypting it and stored for access by the descrambler, wherein enabling the descrambler to use the content key includes decrypting the content key encrypted with the session key using the session key; and wherein preventing the descrambler from using the decrypted content key comprises changing the session key without re-encrypting the content key.

6. The method according to claim 1, wherein preventing the descrambler from using the decrypted content key comprises deleting the decrypted content key.

7. The method according to claim 6, wherein use by the descrambler of the content key comprises storing the content key in a register of the descrambler and preventing the descrambler from using the decrypted content key comprises clearing the decrypted content key from the register.

8. The method according to claim 7, wherein preventing the descrambler from using the decrypted content key comprises clearing the decrypted content key from the register in response to the interval having passed.

9. The method according to claim 7, when dependent on item 5, wherein preventing the descrambler from using the decrypted content key comprises changing session key in response to storing the decrypted content key in the register.

10. The method according to claim 1, wherein enabling the descrambler to use the content key to decrypt the encrypted media content comprises storing the content key in a content key table accessible to the descrambler and wherein preventing the descrambler from using the content key comprises deleting the content key from the content key table.

11. The method according to claim 10, wherein preventing the descrambler from using the content key comprises deleting the content key from the content key table in response to the descrambler loading the content key from the content key table.

12. The method according to claim 1, the method comprising detecting expiry of the interval by monitoring at least one of the group of: an amount of data having been decrypted by the descrambler; a change in an initialization vector received for decrypting the media content in conjunction with the content key; and a clock signal.

13. The method according to claim 1, wherein at least one of the evaluating, re-evaluating, preventing, authenticating, comparing, changing, deleting, clearing and detecting is implemented in a trusted execution environment.

14. The method according to claim 1, wherein at least one of the evaluating, re-evaluating, preventing, authenticating, comparing, changing, deleting, clearing and detecting, as the case may be, is implemented in dedicated hardware.

15. The method according to claim 1, wherein the access condition includes a condition on an output control status or an attack detection status and the re-evaluating includes detecting a change in output control status or detecting an attempt at circumventing access control.

16. A method of controlling decryption of encrypted media content in a client device from a remote server, the method comprising:

sending an encrypted content key and an access condition message to the client device wherein the client device decrypts the content key to decrypt the media content with the content key;

evaluating a server-side condition to determine whether the client device should be able to continue to use the content key to decrypt the media content; and only if the evaluation is positive, sending a token to the client device within an interval in response to the evaluating, wherein the client device prevents the use of the content key to decrypt the media content if the token is not received within the interval.

17. The method according to claim 16, wherein the server-side condition comprises a condition on:

a period of time since a transaction authorizing access to the media content was completed;

a period of time since the media content was first accessed;

a number of client devices associated with a same user account as the client device at which content is being decrypted contemporaneously;

an access control attack notification having been received; and an output control notification having been received.

18. The method according to claim 16, the method comprising detecting expiry of the interval by monitoring at least one of a group of:

an amount of data having been sent;

a change in an initialization vector sent for decrypting the media content in conjunction with the content key; and a clock signal.

* * * * *